United States Patent [19]

Rose et al.

[11] 4,329,920
[45] May 18, 1982

[54] SANDWICHING MACHINE AND TURN-OVER MECHANISM THEREFOR

[75] Inventors: Edward Rose, Skokie; David E. Weber, Chicago, both of Ill.

[73] Assignee: Peters Machinery Company, Subsidiary of Katy Industries, Inc., Chicago, Ill.

[21] Appl. No.: 145,989

[22] Filed: May 2, 1980

[51] Int. Cl.³ .............................................. A21C 9/04
[52] U.S. Cl. ................................ 99/450.4; 99/450.7; 221/266
[58] Field of Search ................. 99/450.1, 450.4, 450.5, 99/450.7; 221/266; 53/532, 534

[56] References Cited

U.S. PATENT DOCUMENTS

| | | |
|---|---|---|
| 2,755,907 | 7/1956 | McCullough et al. |
| 2,868,141 | 1/1959 | Griner ........................... 99/450.4 |
| 2,993,453 | 5/1960 | Fay. |
| 3,084,783 | 4/1963 | Morton et al. |
| 3,119,352 | 1/1964 | Fay ............................... 99/450.4 |
| 3,290,859 | 12/1966 | Talbot. |
| 3,343,504 | 9/1967 | Beik .............................. 99/450.4 |
| 4,226,073 | 10/1980 | Rose et al. ..................... 53/532 |
| 4,232,717 | 11/1980 | Allgaier et al. ................ 221/266 |
| 4,264,253 | 4/1981 | Kennison ....................... 221/266 |

Primary Examiner—Philip R. Coe
Assistant Examiner—Timothy F. Simone
Attorney, Agent, or Firm—Hill, Van Santen, Steadman, Chiara & Simpson

[57] ABSTRACT

Automatic sandwiching machine for cookies and the like. The cookies having a design impressed on one side thereof are conveyed through an oven in rows with the design sides facing upwardly and the opposite or plain sides facing the oven conveyor. At least two side-by-side rows are up-ended and stacked one behind the other and conveyed to adjacent magazines with the sides with the design facing upwardly. The rows of cookies are flared as they leave the oven with four rows of cookies in each group of flared rows and are conveyed to separate magaines design side up. One magazine is spaced in advance of the other. The magazines drop the cookies on a conveyor where the advance cookies are positioned to be deposited on creme deposited on trailing or upstream cookies. One upstream magazine is spaced ahead of the other. In order that both sides of the formed sandwich have designs on each side, the upstream cookies are turned over mechanically by a turn-over wheel, which guides and drops the cookies design side down and plain side up onto conventional parallel spaced wires along which the cookies are carried by conveyor flights on endless chains extending beneath the cookies in the advance magazine, which are design side up. The cookies are released one-by-one by escapement means and then pressed together and counted and delivered for packaging in a conventional manner.

14 Claims, 6 Drawing Figures

SANDWICHING MACHINE AND TURN-OVER MECHANISM THEREFOR

BACKGROUND OF THE INVENTION

This invention is directed to an apparatus for conveying cookies in rows with the design sides of the cookies facing up and orienting the cookies as discharged for sandwiching with the bottom of the sandwiched cookies facing design sides down and the top cookies, design side up, and more particularly to an automatic apparatus in which cookies are fed from an oven design side up and stacked one behind the other, conveyed to transfer chutes in which they are stacked in vertical magazines one on top of the other. The magazines have aligned delivery ends, spaced one in advance of the other, with the advance or downstream cookies being the top cookies of the sandwich and the upstream cookies being the bottom cookies of the sandwich with the design of the bottom cookies facing down and the plain sides of each cookie facing toward each other for forming a cookie sandwich with creme supplied to the plain side of the bottom cookie and the plain side of the top cookie deposited thereon as conveying means carries the sandwiched cookie through pressure means pressing the cookies together and then to the discharge end of the apparatus in which the sandwiches are turned upright and counted and loaded in a tray loader such as that shown and described in the Talbot U.S. Pat. No. 3,290,859, dated Dec. 13, 1966 and the Rose et al application Ser. No. 035,687, filed May 3, 1979, now U.S. Pat. No. 4,226,073 dated Oct. 7, 1980. Said patent and application are incorporated herein as a part hereof.

In prior sandwiching machines and tray loaders, the cookies are taken through an oven by a conveyor which may be a belt conveyor in rows with the design sides up and were formerly stacked in leading and trailing magazines by hand with the design sides of the cookies in the leading magazine, which will be the top cookies of the sandwich up and the cookies in the trailing or upstream magazines, which will be the bottom cookies of the sandwich, with the design sides down. Creme is placed on the plain sides of the bottom cookies and the top cookies are deposited onto the creme on the bottom cookies as in the Fay U.S. Pat. No. 3,119,352 incorporated herein as a part hereof. The sandwiched cookies are then conveyed through pressure means pressing the cookies together to form a sandwich with the design sides of the cookies on the outside. The sandwiched cookies are then delivered to a tray loader, such as shown in the Talbot U.S. Pat. No. 3,290,859 which counts the cookies and then takes the counted cookies and loads the counted cookies into trays or cartons.

The prior art sandwiching machines manufactured by the assignee of the present invention have been very successful, but are not entirely automatic, since the magazines retaining the stacks of advance and trailing cookies must be loaded manually as supplied from the oven. This requires care in loading the leading and trailing magazines in order to assure that the cookies are stacked properly so the design sides of the sandwiched cookies will be on the outside and the plain sides will face each other with creme therebetween, and even then, a cookie will be improperly placed in its magazine so the design side of one cookie will face inside and the design of the other cookie will face outside.

Accordingly, a sandwich apparatus which can convey and stack the cookies as delivered from the oven with no manual attention and assure that the design sides of the top and bottom cookies face on the outside and the plain sides face each other without manual attention is a distinct advance in the art.

SUMMARY OF THE INVENTION

Automatic sandwiching machine in which cookies have a design impressed on the tops thereof and are conveyed through an oven in rows with the plain sides of the cookies facing the oven conveyor and conveyed to leading and trailing magazines with the design sides of the cookies in each magazine facing upwardly. A conveyor in the form of taut parallel wires, and endless chains disposed beneath said wires and flights extending inwardly of said chains and each having a pin extending upwardly along said wires, is directly beneath the discharge ends of the leading and trailing magazines. Since it is desirable that the sandwich have the design sides on the outside, the cookies in the trailing or upstream magazine are automatically turned over as discharged onto the support wires of the conveyor. This is attained by a novel form of pocketed turn-over wheel and guide means for the cookies as discharged onto the wheel, which retains the cookies to the wheel for 180° to accommodate the wheel to turn the cookies, and stripper means for depositing the cookies design-side down on the wires of the conveyor to be carried along said wires beneath a stencil or creme applying valve depositing creme on the plain sides of the bottom cookies and then be carried beneath the leading magazine which deposits a cookie thereon as released by escapement means with the plain sides of the top and bottom cookies facing each other and the design sides on the outside, without manual aid. The facing plain sides of the cookies with creme therebetween are then carried under a pressure shoe and cammed into upright positions and transferred to a tray loader, where they are automatically counted and loaded onto trays as in the aforementioned Talbot U.S. Pat. No. 3,290,859.

Since the upstream cookies are discharged directly from the upstream magazine onto the turn-over wheel, and the turn-over wheel turns the cookies over and deposits them, design sides down directly on the wires of a conveyor, cookie breakage is minimized and uniform sandwiches are attained with a marked increase in production.

The advantages of the present invention are that by dividing the cookies into rows as coming from the oven and stacking the cookies in longitudinally spaced relation with respect to each other and turning over the bottom cookies of the trailing magazine by power, the need for manual labor in loading the cookies is eliminated and the speed of sandwiching the cookies may be markedly increased.

A further advantage of the invention is the provision of a simplified form of high speed turn-over means for turning over trailing cookies for sandwiching, eliminating all manual labor formerly required to stack the cookies and reducing breakage of the cookies and greatly increasing the number of cookies that can be sandwiched in a given time.

A principal object of the invention, therefore, is to increase the speed of sandwiching cookies by eliminating all manual labor heretofore required to properly stack the cookies in magazines for sandwiching so the design sides of the sandwiched cookies will face the outside of the completed sandwich.

A further and important object of the invention is to provide a novel turn-over means, receiving cookies from a vertical magazine which turns over the bottom cookies of the sandwich as deposited on the sandwiching conveyor with the design side down for the application of creme to the plain side of the upstream cookies.

A still further object of the invention is to provide a novel high-speed turn-over means in the form of a turn-over wheel and guide means therefor in cookie-receiving relation with respect to an upstream magazine of a cookie sandwiching machine, depositing the cookies design sides down on conventional support means to be conveyed for the application of creme to the plain sides of the cookies and then dropping a downstream cookie on the creme, design side up, to therefore improve on the sandwiching of cookies and provide a sandwiched cookie with the design sides facing the outside.

While round cookies are shown in the drawings, it should be understood that the cookies may be rectangular or of various other forms, but the top and bottom cookies of each sandwich should be of the same form.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

DESCRIPTION OF THE PREFERRED EMBODIMENT

Figures 1, 3:
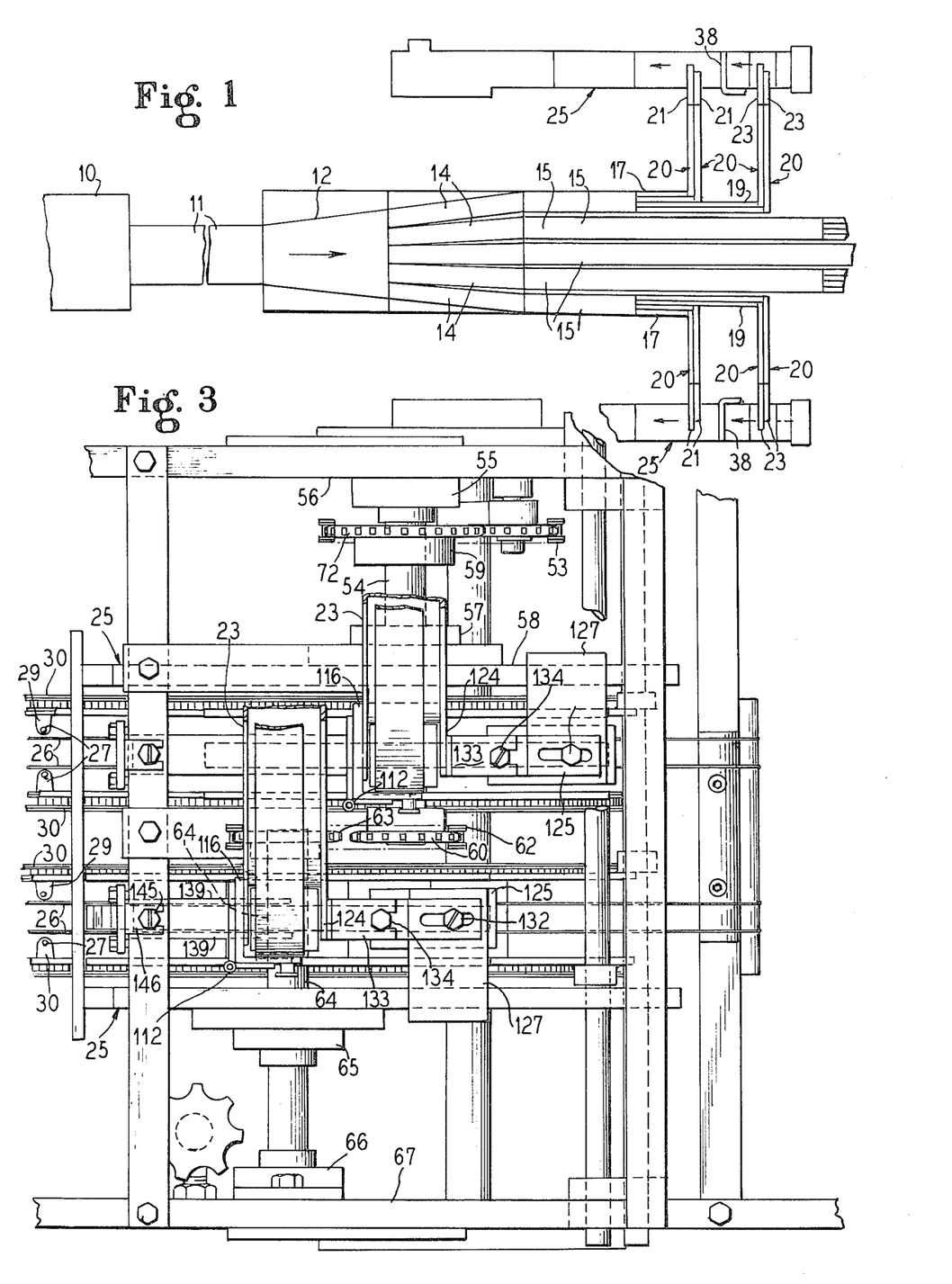
FIG. 1 is a schematic view in plan, diagrammatically illustrating the conveying of cookies from an oven stacked one behind the other in continuous rows and then spreading the cookies in rows in groups of four and separating the groups to upstream and downstream groups of cookies in groups of two for discharging the upstream cookies beneath a creme applying valve, with the creme applying valve between the upstream and downstream cookie magazines.
FIG. 3 is a partial fragmentary plan view with certain parts shown in section to generally illustrate the drive to the turn-over means for the upstream cookies of two side-by-side stacks of cookies together with certain details of the magazines for stacking and delivering the cookies to the turn-over means.

In the diagrammatic showing of the invention in FIG. 1, we have shown an oven 10, a conveyor 11 carrying the cookies through the oven in rows and a diverging conveyor 12 where the cookies are stacked one behind the other in upright positions in continuous rows and then diverged to downwardly facing troughs 14, diverging the rows of cookies and delivering them to parallel troughs 15, which may face downwardly or may be covered. The troughs 15 further deliver the cookies to individual troughs 17, 17 and 19, 19 associated with vibratory conveyors 20, 20 delivering the cookies to be stacked into downstream magazines 21, 21 and upstream magazines 23, 23. The cookies in the magazine 21 and 23 are stacked in said magazines as baked in the oven with design sides up, with the result that the upstream cookies must be turned over, to provide a sandwich with the designs on the outsides of the sandwich.

The magazines 21, 21 and 23, 23 deliver the cookies to a sandwiching machine extending along a frame 25 and of the type herein shown and described in the Patent to Fay U.S. Pat. No. 2,993,453 incorporated herein as a part hereof so not herein shown or described further, except insofar as is necessary for a clear understanding of the present invention.

The sandwiching machine is mounted on the main frame 25 with the magazines 21, 21 spaced downstream of the magazines 23, 23, but in longitudinal alignment with respective of said magazines.

The cookies are deposited from the magazines onto parallel spaced taut wires 26 as in the aforementioned Patent to Fay U.S. Pat. No. 2,993,453, and conveyed along said wires by pins 27 extending upwardly of flights 29 carried by certain links of endless conveyor chains 30 of the conveyor.

Figures 2, 6:
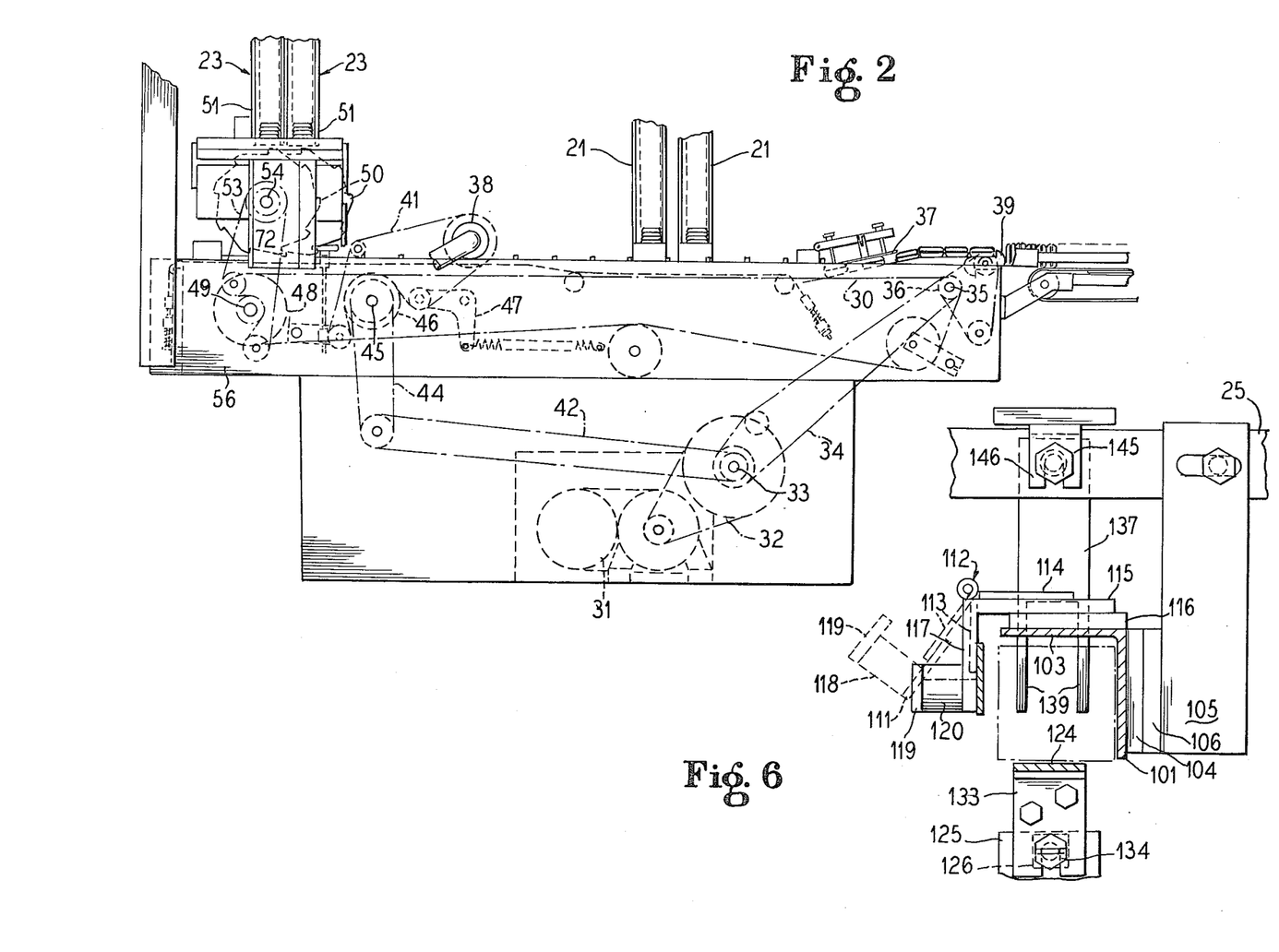
FIG. 2 is a view in side elevation of a sandwiching device generally illustrating the upstream and downstream magazines and the turn-over means for the cookies in the upstream magazines depositing the cookies on the taut support wires of a conveyor with the plain sides of the cookies up together with creme applying mechanism between the upstream and downstream stacks of cookies and certain details of the drive means for the turn-over means, the conveyor and certain other elements of the apparatus.
FIG. 6 is a horizontal fragmentary sectional view taken along line VI—VI of FIG. 5, illustrating certain details of the clean-out gate for one magazine and the magnetic lock therefor.

The drive to the endless chains 30 of the conveyor is generally shown in FIG. 2 as including a motor and speed reducer 31. The speed reducer drives a sprocket 32 on a cross shaft 33, which in turn drives a chain and sprocket drive 34. The chain and sprocket drive 34 drives a cross shaft 35 having a plurality of sprockets 36 thereon for driving the conveyor chains 30, it being understood that individual taut wires and conveyor chains 30 and sprocket drives are provided for the side-by-side magazines 23, 23 and 21, 21 for carrying the cookies along the wires 26 from said side-by-side magazines 23, 23 beneath a creme applying valve or stencil 39 applying creme to the cookies discharged from the side-by-side upstream magazines 23, 23 and beneath the individual side-by-side magazines 21, 21 to and beneath a pressure shoe 37 exerting pressure on the sandwiched cookies as conveyed along an inclined plane to upending cams 39. Said cams are driven to upend the generally horizontal sandwiched cookies to vertical positions and discharge the cookies onto a counting conveyor (not shown) as in the Fay U.S. Pat. No. 2,993,453, and the Talbot U.S. Pat. No. 3,290,859, incorporated herein as a part hereof and no part of the present invention.

The valve or stencil 38 for applying sandwich creme to the plain sides of the upstream cookies as turned over and supplied to the wires 26 may be like that shown in the Patent to Rose U.S. Pat. No. 4,162,882, so need not herein be shown or described in detail. The drive to said valve mechanism or stencil includes a chain and sprocket drive 41, diagrammatically shown in FIG. 2. The drive to the chain of the chain and sprocket drive 41 includes a chain and sprocket drive 42 driven from the shaft 33 of the chain and sprocket drive 32 and a chain and sprocket drive 44, driving the chain and sprocket drive 41.

A spring-biased take-up 47 of a conventional form is provided for maintaining tension on the chain and sprocket drive 41. The in-by or upstream ends of the conveyor chains 30 turn about direction-changing sprockets 48, which have driving connection with the transverse shaft 49 driving a turn-over wheel 50 for each magazine 23 as will now be described.

The drive to the turn-over wheels 50, the stencil 38 and the up-ending cams 39 is from the conveyor chains 30 and is thereby timed with the conveyor chains 30, flights 29 and pins 27 to propel a cookie discharged from the associated turn-over wheel 50 along the parallel wires 26, design side down, and effect the application of creme to the plain side of the cookie deposited by the associated turn-over wheel 50, as the cookie passes under the creme valve or stencil 38. Said stencil 38 is actuated to apply equal amounts of creme to the plain sides of the cookies of each row of cookies as the cookies pass under said creme valve or stencil. The release of a cookie from the downstream magazine 21 design side up is effected by operation of a suitable escapement means (not shown), as in the aforementioned Patent to Fay U.S. Pat. No. 3,119,352.

Referring now to the magazines 23, 23 in general and the turn-over wheels 50, 50 spaced therebeneath in particular, each magazine 23 extends from and receives cookies from an associated vibratory conveyor 20 and has an upper downwardly curved portion terminating into a vertically extending chute 51 supplying cookies in stacked relation with respect to each other to successively deposit cookies from the bottom of the stack to the turn-over wheels 50, 50 for said magazines 23, 23. The side-by-side magazines 23 are shown as laterally spaced from each other a distance sufficient to afford access to the two magazines.

The turn-over wheels 50, 50 are each mounted on the respective cantilever end portions of shafts 54 and 64, the shaft 64 being spaced in advance of the shaft 54 in accordance with the spacing of the centers of the stacking chutes 51 of said magazines 23.

Figure 5:
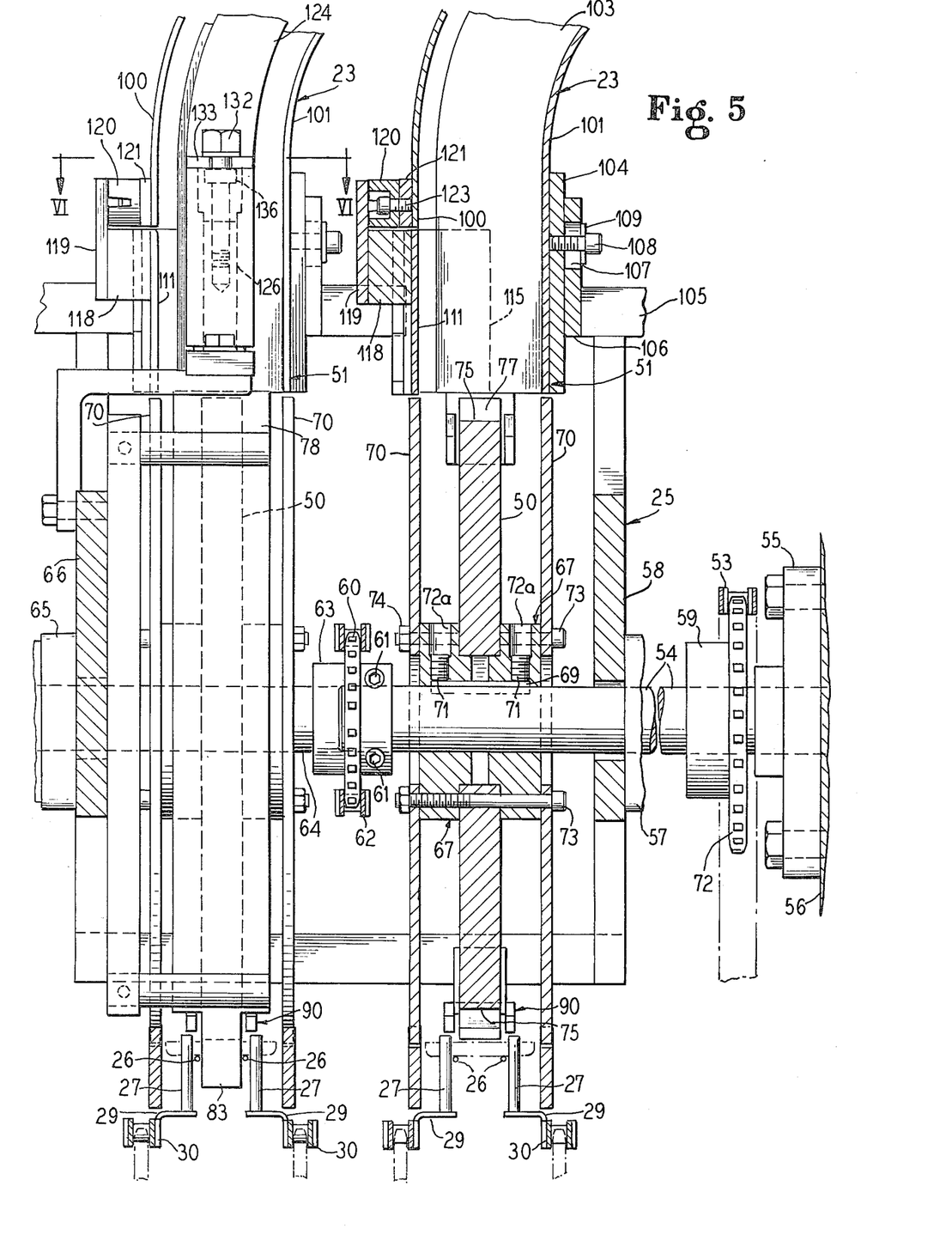
FIG. 5 is a partial fragmentary transverse sectional view of the magazines and turn-over means illustrating certain details of construction of one magazine and turn-over wheels as well as the wires supporting the cookies as discharged from the turn-over wheels, with the plain sides facing upwardly and the design sides facing downwardly.

As shown in FIG. 5, the shaft 54 is journalled at one end in a bearing 55 suitably secured to the inside of an outer plate 56 of the main frame 25 for the turn-over and creme applying mechanism. The shaft 54 is also journalled in a bearing 57 spaced inwardly of the bearing 55 and suitably secured to the outer side of a frame structure 58, parallel to the side plate 56 (FIG. 3). The shaft 54 extends through the wheel 50, which is suitably secured to said shaft to be rotated thereby, as will be more clearly described as this specification proceeds.

A sprocket 60 is clamped or otherwise secured to the over-hanging end of the shaft 54 as by socket head screws 61. The sprocket 60 meshes with and drives an endless chain 62 having driving engagement with a sprocket 63 suitably secured to the stud end of a shaft 64 for driving said shaft. Between the bearings 55 and 57 and keyed or otherwise secured to the shaft 54 is a drive sprocket 72 driven from the shaft 49 for the conveyor chains 30 by the chain and sprocket drive 53 (FIG. 2).

Each turn-over wheel 50 has annular side plates or flanges 70, 70 spaced from opposite sides thereof and secured to said wheel to be rotated therewith and form a retaining means for the cookies discharged from the chute 51 of the associated magazine 23. Said flanges may be of substantially the same or of a slightly greater diameter than the outside diameter of the associated wheel 50.

Each wheel 50 is mounted on its associated drive shaft on a hub 67, shown in FIG. 5 as being in two pieces, one piece of which extends along each side of the wheel 50 and has a reduced diameter portion extending through a central bored portion of the turn-over wheel.

Figure 4:
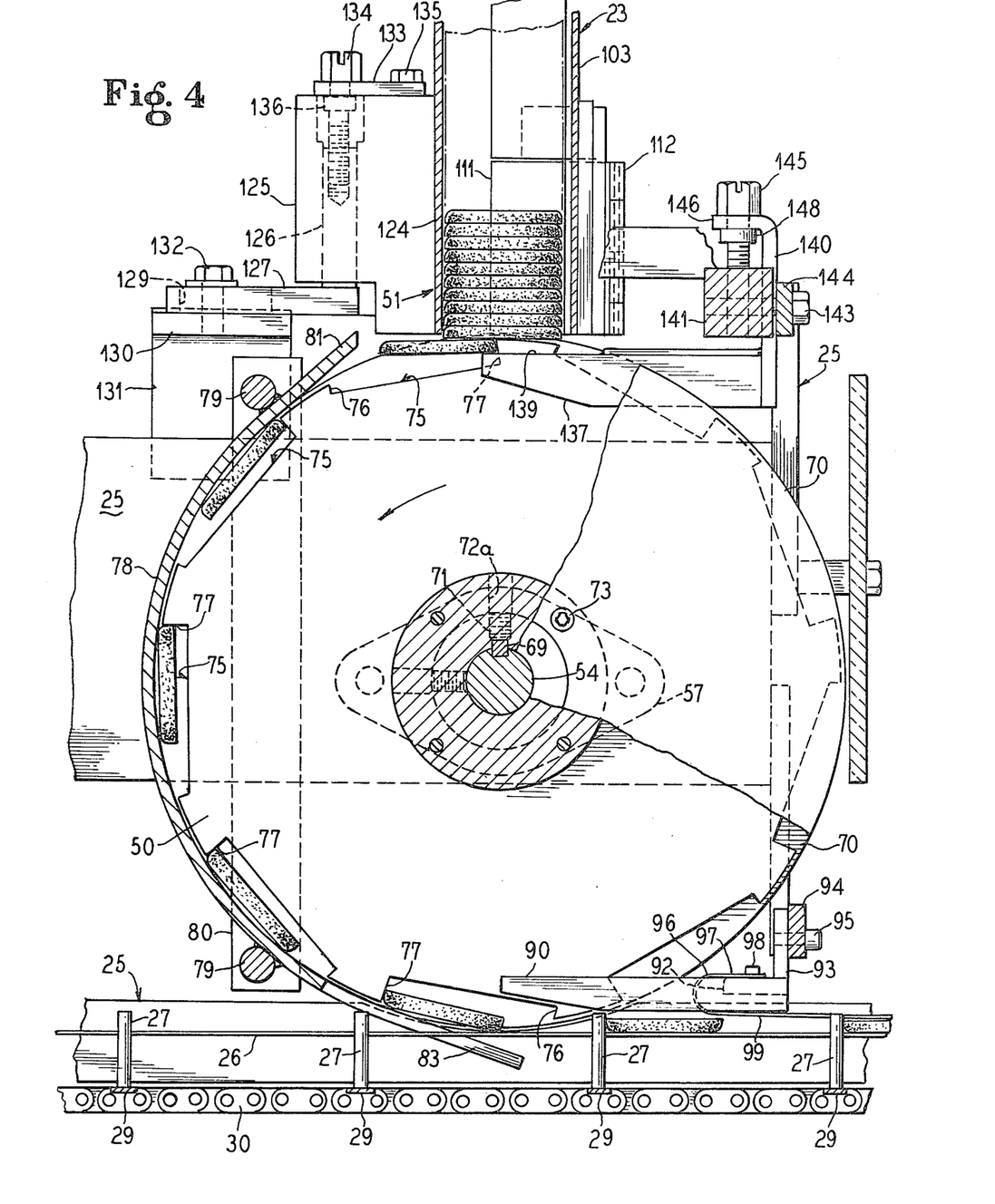
FIG. 4 is a fragmentary longitudinal sectional view illustrating a magazine supplying cookies, design sides up, to a turn-over device, turning the cookies over and depositing them on the support wires of the conveyor of the sandwiching machine, to be carried along said wires for the application of creme to the plain sides thereof, and then depositing downstream cookies thereonto with the design sides facing upwardly.

As shown in FIGS. 4 and 5, the hub 67 for each turn-over wheel 50 including the reduced diameter portions of said hubs are keyed or otherwise secured to the drive shaft 54 as by a key 69. Set screws 71 are threaded in radial bores of each hub portion to engage opposite ends of the key 69 and retain said key to the drive shaft 54. Equally spaced socket-headed bolts 73 extend through the side plates 70 and hubs 67 and have nuts 74 secured to the inner sides thereof and abutting an inner side plate or flagne 70, to positively secure said flanges to the hubs 67 and turn-over wheel 50 in laterally spaced relation with respect to opposite sides of said turn-over wheel 50, to rotate with said turn-over wheel at the speed of rotation thereof.

The next adjacent turn-over wheel 50 is mounted on the shaft 64 in the same manner as the wheel just described and is rotatably driven by the chain 62 and sprockets 60 and 63 at the speed of rotation of the turn-over wheel just described and in the same direction as the direction of rotation of the turn-over wheel 50 just described.

Each turn-over wheel 50 has a plurality of equally spaced cookie receiving receptacles 75 recessed in and equally spaced about the circumference thereof. The receptacles 75 each have a flat chordal bottom terminating in a relatively shallow leading end 76 and a deeper trailing end 77 for receiving a cookie dropped from the respective stacking chute 23 and propelling the cookie through substantially 180° and depositing the cookie onto an associated pair of parallel wires 26 design side down to be carried by the pins 27 projecting from the flights 29 of the conveyor chains 30 along the outsides of the wires 26, to successively propel cookies beneath the creme applying valve or stencil 38 for the application of creme to the plain sides of the cookies.

A guide or retainer 78 extends partially about each wheel 50 between the flanges 70, but spaced radially outwardly of the turn-over wheel 50 to a position beneath the taut wires 26, supporting the cookies to be propelled to rotate with said turn-over wheel and be positioned design sides down on the taut wires 26 to be supported on said taut wires 26 and be conveyed therealong by the pins 27. The guide or retainer 78 is welded or otherwise secured to vertically spaced transverse rods 79 mounted on and extending inwardly from a bracket bar 80 extending vertically along opposite sides of the associated turn-over wheel and suitably secured to the frame structure 25 of the sandwiching machine. The guide or retainer 78 may be adjustably moved toward and from the turn-over wheel 50 and held in fixed relation with respect thereto by adjusting the bracket bar 80 in a suitable manner.

As shown in FIG. 4, each guide or retainer 78 for each turnover wheel 50 has an outwardly flared upper end 81 extending generally tangentially of the flanges 70 and beveled at the entering end thereof, to assure that each cookie drop onto its receptacle 75 to be carried thereby along the inside of the guide or retainer 78. The guide or retainer 78 has a reduced width lower end portion 83, extending generally tangentially of the flanges 70 downwardly between the taut wires 26 and supporting the cookies to be uniformly deposited on the taut wires 26 to be conveyed therealong by the pins 27 and flights 29 with the design sides of the cookies facing said wires.

Extending from the reduced width end portion 83 of the guide or retainer 78 along the insides of the flanges 70 is a bifurcated stripper 90 extending over the chordal bottoms of the receptacles 75 as they pass thereby, to strip any cookies that may tend to stick to the receptacles and to assure that the cookies be deposited design sides down on the wires 26. The furcations of said stripper 90 extend from and along opposite sides of a horizontal leg 92 of an angle iron 93 and may be welded or otherwise secured thereto. The vertical leg of said angle iron is shown as secured to a transverse bar 94 as by a socket-headed machine screw 95 which bar may be vertically adjustable to adjust the position of said stripper. Said hold-down is shown as being of a generally U-shaped form in side elevation and as extending between the furcations of the stripper 90 and having a short leg 97 suitably secured to the top surface of the horizontal leg 92 of the angle iron as by a machine screw 98. The hold-down extends about the end of the horizontal leg 92 of the angle iron and beneath said angle iron and has a long leg 99, which may extend generally parallel to the support wires 26 for the cookies for a substantial distance to hold the cookies to said wires for movement therealong, as clearly shown in FIG. 4.

The magazines 23 are each of the same construction and are best shown in FIGS. 3, 4 and 5. As shown in FIG. 5, the magazine 23 includes the vertical chute 51 which has side walls 100 and 101 curving downwardly to form the vertical walled chute 51 in general alignment with the flanges 70 of the turn-over wheels to deposit cookies therebetween onto the receptacles 75 of the turn-over wheels 50 between the annular walls or flanges 70 thereof. The wall 101 may be one leg of an angle having a right-angled leg 103 bent to conform to the curvature of the upper portion of said wall 101 and extending toward the wall 100 to form a rear wall for the magazine.

As shown in FIG. 5, the wall 101 has a plate 104 extending along the outside of the vertical portion thereof and forming a means for securing said plate to a transverse bar 105 of the frame 25 for the sandwiching machine. The transverse bar 105 has a plate 106 secured thereto and extending upwardly therefrom and abutting the outer side of the plate 104. The plate 106 has a vertical slot 107 therein through which extends a machine screw 108, shown as being threaded in the plate 104. A washer 109 extends across the slot 107 and affords an abutment for the head of the machine screw 108, to accommodate said screw to vertically adjust the wall 101 relative to the annular disks or flanges 70 for the turn-over wheel 50. Adjustment of the chute may only be necessary when setting up the machine.

Forming a continuation of the wall 100 is a hinged wall 111, which may be hinged outwardly to afford a means for cleaning out the chute 51, to maintain a clean chute for the flow of cookies downwardly therealong. In FIG. 6, the hinged wall 111 is shown as carried by a hinge 112, mounted on the inside of and extending from a hinge plate 113 of said hinge. The hinge 112 also has a hinge plate 114 carried by an angle bracket 115. Said angle bracket 115 is shown in FIGS. 4 and 5 as secured to a plate 116 which in turn is secured to the outside of the right-angled leg 103 of the chute 23. The angle bracket 115 has a right-angled arm 117 terminating above the wall 111 to accommodate said wall 111 to swing outwardly to and beyond the dotted line position shown in FIG. 6.

The hinged wall 111 has a block 118 secured to its outer side, which in turn has a spacer plate 119 extending therealong and above the top surface thereof and adapted to abut a permanent magnet 120 (FIG. 5) mounted on the outside of the wall 100 and extending outwardly therefrom. The magnet 120 is spaced from the wall 100 by a spacer plate 121 and is secured thereto as by a socket-headed machine screw 123 threaded in the plate 121 and extending within a socketed portion of the magnet. The magnet is thus so positioned as to engage the plate 119 and hold the hinged wall 111 in position to form a downward continuation of the wall 100 of the chute 23, but to accommodate ready opening of said hinged wall by grasping the block 118 or spacer plate 119.

A gate 124 (FIG. 4) extends along the advance end of the chute between the walls 100 and 101 and generally conforms to the curved form of said chute and extends therealong for a substantial distance, to retain cookies to said chute. Said gate 124 terminates adjacent its lower end in substantial alignment with the bottom of the right-angled leg 103 forming the rear wall of the chute 23, but may be elevated or lowered with respect to the bottom of said rear wall in accordance with the thickness of cookies discharged into the receptacles or pockets 75. As shown in FIGS. 4 and 5, the gate 124 is mounted on the inner end of a block 125, adjustably mounted on a squared post 126. Said post 126 extends upwardly of a bracket plate 127 and may be secured thereto at its lower end. The bracket plate 127 may have a slot 129 extending for a portion of the length thereof and is shown as being adjustably secured to a horizontal leg 130 of an angle 131 as by a machine screw 132 having a washer thereon extending over the slot 129 and adapted to clamp the plate 127 and squared post 126 to the frame 25 for the apparatus. The slot 129 accommodates movement of the post 126 and block 125, including the gate 124 toward and from the right-angled leg 103 of the magazine 23 in accordance with the size or diameter of cookies in said magazine. Vertical adjustment of the gate 124 is attained by a slotted machine screw 134 extending through an outwardly opening slot (not shown) formed in a plate 133 secured to the top of the block 125 as by at least one machine screw 135.

The machine screw 134 is threaded in the post 126, as clearly shown in FIG. 4, and has a collar 136, which may be formed integrally therewith, and abut the bottom of the plate 133. Turning of said machine screw in one direction or another will therefore cause the block 125 to move vertically along the post 126 and adjust the position of the lower end of the gate 124 in accordance with the thickness of cookies stacked in the chute 23, as clearly shown in FIG. 4, to accommodate the dropping of cookies onto the receptacles 75 one-by-one as determined by the spacing between said gate and a bifurcated support 137.

The bifurcated support 137 extends along opposite sides of the turn-over wheel 50, inwardly of the flanges 70 and has a top cookie-supporting surface 139, supporting the cookies as dropped from the chute 23 into the receptacles 75. The support 137 is vertically adjustable relative to the gate 124 and has a bracket arm 140 extending upwardly of its rear end and slidably guided in a bar 141 having an outwardly opening slotted portion extending along the outer sides of the bracket arm 140 and is secured to the frame 25 as by a machine screw 143. Said machine screw is shown as extending through a rail 144 and into the bar 141 for retaining said block in position.

The support 137 is vertically adjustable by operation of an adjustment screw 145 extending through an inturned end 146 of the support bracket 140. The adjustment screw 145 has a collar 148 which may be formed integrally therewith and may engage the bottom of the in-turned end 146 of the support bracket 140, to slidably adjust said support bracket 140 and the supporting surfaces 139 of the bifurcated cookie support 137 relative to the lower end of the gate 124 in accordance with the thickness of the cookies stacked in the chute 51 and discharged into the receptacles 75. The machine screw 143 serves to clamp the support bracket 140 and its projecting bifurcated support 137 in position and hold said bifurcated support from movement relative to the chute 51 when the support surface 139 of said bifurcated support 137 is properly adjusted relative to the gate 124. The support surface 139 of the bifurcated support 137 need only be adjusted when thicker or thinner cookies are to be loaded onto the turnover wheel 50.

In briefly summarizing operation of the device, the chutes 51 may each be stacked with a vertical stack of cookies, design sides up, as conveyed from the oven to said stacking chutes with no manual attention. The gate 124 and support 137 may then be adjusted, if necessary, in accordance with the thickness of the cookies, to accommodate a cookie to be initially supported on the support surfaces 139 of the bifurcated support 137 and to pass under the bottom of the gate 124 as engaged by the trailing walls of the successive receptacle 75, to be deposited into the respective receptacles and moved under the guide or retainer 78 for substantially 180° into the inverted position shown in FIG. 4. The strippers 90 passing above the conveying pins 27 may then serve to strip any cookies from their receptacles which may tend to stick thereto, to be conveyed design sides down under a stencil or creme applying valve 38.

It is, of course, understood that the two turn-over wheels deposit cookies in side-by-side rows and that the creme valve deposits equal amounts of creme to the plain faces of the two rows of cookies passing thereunder as the cookies are conveyed along the wires 26 by the pins 27, beneath the magazines 21, 21, stacked with vertical stacks of cookies, design sides up and released by escapement means (not shown) or any other suitable release means and dropped on the creme on the cookies passing thereunder and further conveyed along the wires 26 by the pins 27 to and under the pressure shoes 37 compressing the creme as the cookies pass thereunder to the up-ending cams 39 up-ending the cookies into vertical positions to be conveyed for counting and packaging in a conventional manner, as shown in the Patent to Talbot U.S. Pat. No. 3,290,459, previously mentioned.

It may further be seen that any number of rows of cookies may be conveyed through the oven and sandwiched and that the speed and accuracy of sandwiching has been markedly increased with no manual labor or damage to the cookies as turned over in the first stage of the sandwiching apparatus. It should be understood, however, that a sandwiching apparatus is provided for each four rows of cookies and that a separate packaging apparatus may be associated with each sandwiching apparatus.

As an example of the speed at which cookies may be sandwiched, the turn-over wheels 50 have been driven as high as 600 rpm and performed properly to turn cookies over onto the conveyor wires 26 for the application of creme thereto and sandwiching as previously described. At this high speed of rotation of the turn-over wheels 50, it is obvious that the speed of the creme valve 38 be increased to assure the continuous application of creme to the cookies and that the speeds of the conveyor chains 30 be increased to conform to the speeds of rotation of the turn-over wheels 50.

We claim as our invention:

1. In an apparatus for sandwiching cookies, cakes and the like conveyed from a baking oven and having designs impressed on one side thereof and plain sides facing the oven,
   a frame,
   a conveyor extending along said frame,
   longitudinally spaced upstream and downstream magazines extending over said frame and conveyor and retaining the cookies in vertical stacks,
   means supplying cookies to said magazines directly from the oven as baked design sides up,
   means extending over said conveyor between the upstream and downstream magazines for supplying a measured amount of creme to the upstream cookies as they pass thereunder,
   a turnover wheel in cookie receiving relation with respective to the upstream magazine and having a plurality of equally spaced cookie receiving receptacles recessed therein and spaced within the circumferential margin thereof,
   each receptacle having a shallow leading end and a deeper trailing end and having a chordal bottom between said leading and trailing ends, both leading and trailing ends opening to the circumference of said wheel,
   flanges spaced from opposite sides of said turnover wheel spaced apart a distance substantially equal to the diameter of the cookies to be turned over,
   an upper cookie support extending along each side of said turnover wheel between said flanges and having aligned support surfaces parallel to the bottoms of the cookies in said magazine, and beneath the top of the discharge end of said magazine a distance substantially equal to the thickness of a cookie to be turned over, and
   supporting the stack of cookies in said magazine with the bottom cookie of the stack in position to be engaged by the trailing end of a respective receptacle to be advanced along said support and deposited into said receptacle, and
   a retainer extending circumferentially about said wheel within said flanges and having an upper leading end extending generally tangentially of the periphery of said flanges and a bottom trailing end supporting the cookies to be deposited on said conveyor and extending generally tangentially of the periphery of said flanges, and a stripper extending along opposite sides of said wheel for stripping the bottom cookies from their receptacles as they pass thereby along the trailing end of said retainer and onto said conveyor extending therebeneath, design sides down.

2. The sandwiching apparatus of claim 1 in which the conveyor includes parallel spaced taut wires, forming supports for said cookies as discharged from said wheel, spaced endless chains disposed beneath said wires and having flights extending upwardly therefrom along the outsides of said wires, wherein the stripper extends above said tangential discharge end of said retainer along opposite sides of said wheel for stripping cookies that may stick to said receptacles, onto said tangential discharge end of said retainer and the wires of said conveyor.

3. The apparatus of claim 1, wherein the stripper extends along opposite sides of said wheel within the margins of the flanges and spaced outwardly of opposite sides of said wheel, and a resilient hold-down extends from said stripper as a rearward continuation of the bottom surface thereof for holding cookies to said wires as conveyed past said stripper.

4. The apparatus of claim 3, wherein said magazine has an advance wall, and means are provided to vertically adjust said advance wall with respect to said wheel in accordance with the thickness of the cookies supported in said magazine to be propelled along said support by the relatively deep trailing ends of said receptacles as deposited on the flat bottom of an associated receptacle as it passes by said support.

5. The apparatus of claim 4, in which the means vertically adjusting said front wall of said magazine comprises an upright post mounted on said frame in spaced relation with respect to said front wall, a block forming a mounting for said front wall and extending therefrom, said post being of a generally rectangular form and said block having an opening extending therethrough, conforming to the form of said post and said block is vertically movable along said post, a clip secured to said block and extending over said post, and screw means threaded in said post and having a collar fitting under said clip and cooperating with said screw means for adjustably moving said block and front wall relative to said support and retaining said front wall in fixed vertical spaced relation with respect to said support, determined by the thickness of cookies in said magazine.

6. The apparatus of claim 5, including a clean-out door for said magazine, and hinge means supporting said door to move to open and closed positions and accommodating opening of said door to afford a means for cleaning cookies and crumbs from said magazine.

7. The apparatus of claim 6, including magnetic locking means, locking said door in position to close said magazine.

8. The apparatus of claim 7, including means vertically adjusting said stripper and said hold-down relative to said taut wires and holding said stripper and hold-down in generally fixed relation with respect to said wires.

9. In an apparatus for sandwiching cookies, cakes and the like as baked and having designs impressed on the outsides thereof and plain sides facing the bottom of the baking oven, at least two side-by-side conveyors extending along said frame, individual upstream magazines extending over said conveyors and spaced in generally side-by-side relation with respect to each other, with one spaced in advance of the other a distance sufficient to afford access to each magazine for clean-out purposes, means supplying cookies as baked to said magazines in vertical stacked relation, design sides up, a turn-over wheel beneath each magazine in cookie receiving relation with respect thereto, each turn-over wheel having a plurality of equally spaced cookie receiving receptacles therein opening to the periphery of said wheel, and having a flange spaced from opposite sides of said wheel, means supporting said cookies in said magazine and controlling the discharge of cookies one by one from each magazine into the said receptacles as said receptacles pass thereby, an individual guide extending from an associated magazine partially about each wheel from the upper end portion thereof and terminating in substantially diametrically opposed relation with respect to the magazine for retaining cookies to be turned over by said wheel, and means rotatably driving said turn-over wheels in the same directions of rotation and at the same rates of speed, for discharging cookies on the conveyors therebeneath, design sides down, for the application of creme to the plain sides of said cookies, and the depositing of other cookies thereon design sides up.

10. The apparatus of claim 9, wherein the means driving the turn-over wheels comprises, means driving one of said turn-over wheels at a linear speed comparable to the speed of travel of the associated conveyor, and means driven by said one turn-over wheel for driving the other of said turn-over wheels in the same direction and at the same speed of rotation as the speed of rotation of said one turn-over wheel.

11. The apparatus of claim 10, wherein the drive from one turn-over wheel to the other turn-over wheel is a chain and sprocket drive, wherein annular flanges are spaced from opposite sides of each turn-over wheel and rotate therewith and are of substantially the same diameters as the outside diameters of said wheels, wherein each cookie receiving receptacle opens to the periphery of the respective wheel and has a bottom extending chordally of the periphery of the wheel, a relatively short radially extending leading end extending outwardly of the leading end of said receptacle and a longer trailing end extending radially outwardly from the trailing end of the associated receptacle and successively ejecting cookies from the bottom of an associated magazine into an associated receptacle.

12. The apparatus of claim 11, wherein an individual cookie support is spaced beneath the bottom of each magazine in accordance with the thickness of cookies in said magazines and within the limits of said flanges, and an advance wall of each magazine cooperates with said support and is vertically adjustable relative to said support in accordance with the thickness of cookies in each magazine.

13. The apparatus of claim 12, including strippers generally diametrically spaced from said magazines and stripping cookies from said receptacles as turned over that may tend to stick thereto, and a resilient hold extending from said stripper along the associated conveyor in the direction of travel thereof, for holding cookies thereto as moving past said turn-over wheels.

14. The apparatus of claim 12, including a hinged clean-out door for each magazine to accommodate cleaning of the magazines from crumbs that may lodge therein and magnets for releasably holding said clean-out doors closed.

* * * * *